(12) United States Patent
Yang et al.

(10) Patent No.: US 11,199,989 B2
(45) Date of Patent: Dec. 14, 2021

(54) METHODS, APPARATUSES AND COMPUTER PROGRAM PRODUCTS FOR SUPPORTING AND PERFORMING DATA REPLICATION OF VIRTUAL MACHINE

(71) Applicant: EMC IP Holding Company LLC, Hopkinton, MA (US)

(72) Inventors: Lifeng Yang, Beijing (CN); Jian Gao, Beijing (CN); Xinlei Xu, Beijing (CN)

(73) Assignee: EMC IP Holding Company LLC, Hopkinton, MA (US)

(*) Notice: Subject to any disclaimer, the term of this patent is extended or adjusted under 35 U.S.C. 154(b) by 46 days.

(21) Appl. No.: 16/586,231

(22) Filed: Sep. 27, 2019

(65) Prior Publication Data

US 2020/0133502 A1    Apr. 30, 2020

(30) Foreign Application Priority Data

Oct. 30, 2018  (CN) .......................... 201811280052.3

(51) Int. Cl.
*G06F 3/06* (2006.01)
*G06F 16/248* (2019.01)
(Continued)

(52) U.S. Cl.
CPC ............ *G06F 3/065* (2013.01); *G06F 3/0619* (2013.01); *G06F 3/0664* (2013.01);
(Continued)

(58) Field of Classification Search
CPC ...... G06F 3/065; G06F 3/0664; G06F 16/248; G06F 16/188; G06F 16/184
See application file for complete search history.

(56) References Cited

U.S. PATENT DOCUMENTS 9,304,999 B1   4/2016   Bono et al.
9,305,071 B1   4/2016   Bono et al.
(Continued)

OTHER PUBLICATIONS

Huang et al, High Performance Virtual Machine Migration with RDMA over Modern Interconnects, IEEE International Conference on Cluster Computing. IEEE, 2007 [retrieved from internet Dec. 17, 2020][<URL:https://ieeexplore.ieee.org/stamp/stamp.jsp?arnumber=4629212>] (Year: 2007).*

*Primary Examiner* — David Yl
*Assistant Examiner* — Nicholas A. Paperno
(74) *Attorney, Agent, or Firm* — BainwoodHuang

(57) ABSTRACT

Techniques support and perform data replication of a virtual machine. Changed data tracking is performed on a storage unit associated with the virtual machine in a storage system, to obtain changed data related information related to the virtual machine, wherein the changed data related information indicates a range and a type of data change related to the virtual machine; from the changed data related information, changed data related information related to the virtual machine within a specified range is obtained in response to receiving an obtainment request of the storage system for changed data related information within the specified range; and the changed data related information within the specified range is sent to the storage system. Accordingly, changed data related information can be provided to a storage system, such that the storage system can implement an optimized data replication operation based on the changed data related information.

20 Claims, 12 Drawing Sheets

(51) Int. Cl.
*G06F 16/16* (2019.01)
*G06F 16/188* (2019.01)
*G06F 16/178* (2019.01)

(52) U.S. Cl.
CPC .......... *G06F 3/0673* (2013.01); *G06F 16/168* (2019.01); *G06F 16/178* (2019.01); *G06F 16/188* (2019.01); *G06F 16/248* (2019.01)

(56) References Cited

U.S. PATENT DOCUMENTS

| | | |
|---|---|---|
| 9,507,787 B1 | 11/2016 | Bono et al. |
| 9,727,429 B1 | 8/2017 | Moore et al. |
| 9,805,105 B1 | 10/2017 | Bono et al. |
| 9,875,042 B1 | 1/2018 | Natanzon et al. |
| 10,067,694 B1 | 9/2018 | Natanzon et al. |
| 10,447,524 B1 | 10/2019 | Bono et al. |
| 2011/0022812 A1* | 1/2011 | van der Linden .. H04L 67/1097 711/163 |
| 2014/0040572 A1* | 2/2014 | Kotagiri ................ G06F 3/0664 711/159 |

* cited by examiner

METHODS, APPARATUSES AND COMPUTER PROGRAM PRODUCTS FOR SUPPORTING AND PERFORMING DATA REPLICATION OF VIRTUAL MACHINE

CROSS-REFERENCE TO RELATED APPLICATION

This application claims priority to Chinese Patent Application No. CN201811280052.3, on file at the China National Intellectual Property Administration (CNIPA), having a filing date of Oct. 30, 2018, and having "METHODS, APPARATUSES AND COMPUTER PROGRAM PRODUCTS FOR SUPPORTING AND PERFORMING DATA REPLICATION OF VIRTUAL MACHINE" as a title, the contents and teachings of which are herein incorporated by reference in their entirety.

FIELD

Some embodiments of the present disclosure relate to the field of data storage, and more specifically, relate to a method apparatus and computer program product for supporting data replication of a virtual machine and a method apparatus and computer program product for performing data replication of a virtual machine.

BACKGROUND

A storage system can be constructed based on one or more physical storage devices, to provide a data storage capacity. In many storage systems, such as VNX Unity, native data replication functions can be provided between two similar types of system architecture. The current VNX Unity supports the following replication technologies: Native Synchronous Block Replication, Native Asynchronous Block and File Replication, and RecoverPoint. These technologies are designed for general data replication requirements, and not optimized for any of specific applications.

In particular, for a virtual machine-based application scenario, if a Virtual Machine (VM) is required to perform storage VMotion, it is necessary to relocate a Virtual Machine Disk Format (VMDK) files to another location. It typically needs to first create a snapshot and then perform data movement. From the viewpoint of a storage system, the replication is implemented by replicating VMDK files or by calling a Native Asynchronous Block/File Replication function of the storage system. The replication procedure of the storage VMotion has no difference from other common data replication. For example, when the VMware relocates a virtual machine and VMDK files from a data storage unit to another data storage unit, VMware software will perform VMDK file replication, or offload the operation to native replication functions of storage arrays. However, whichever method is used, a storage system is unable to be aware of the data types, and therefore the storage procedure is identical to replication for a common database or text files.

SUMMARY

In some embodiments of the present disclosure, there is provided a technical solution for supporting and performing data replication of a virtual machine.

In a first aspect of the present disclosure, there is provided a method of supporting data replication of a virtual machine. The method can be performed at a virtual machine server. The method includes performing, for a storage unit associated with the virtual machine in a storage system, changed data tracking to obtain changed data related information related to the virtual machine, wherein the changed data related information indicates a range and a type of data change related to the virtual machine, obtaining, from the changed data related information, changed data related information related to the virtual machine within a specified range, in response to receiving an obtainment request of the storage system for changed data related information within the specified range; and sending, to the storage system, the changed data related information within the specified range.

In a second aspect of the present disclosure, there is provided a method of performing data replication of a virtual machine. The method can be performed at a replication source storage system. The method includes: in response to receiving a data replication request for the virtual machine, sending, to a virtual machine server, an obtainment request for changed data related information related to the virtual machine within a specified range; receiving changed data related information related to the virtual machine within the specified range from the virtual machine server, wherein the changed data related information within the specified range indicates a range and a type of data change related to the virtual machine within the specified range; obtaining a range and a type of data change indicated in the changed data related information within the specified range, and obtaining changed data corresponding to the range of the data change from a storage unit associated with the virtual machine; and sending information containing the range and the type of the data change and the changed data as obtained to a replication destination storage unit associated with the storage unit.

In a third aspect of the present disclosure, there is provided a method of performing data replication of a virtual machine. The method can be performed at a replication destination storage system. The method includes: receiving information containing a range and a type of data change and changed data, the data change being associated with a replication source storage unit of the virtual machine; and replicating, based on the data change type, the changed data to a data portion corresponding to the change range.

In a fourth aspect of the present disclosure, there is provided an apparatus for supporting data replication of a virtual machine. The apparatus includes: a processor; and a memory coupled to the processor, the memory having an instruction stored therein which, when executed by the processor, causes the apparatus to perform acts in the method in the first aspect of the present disclosure.

In a fifth aspect of the present disclosure, there is provided an apparatus for supporting data replication of a virtual machine. The apparatus includes: a processor; and a memory coupled to the processor, the memory having an instruction stored therein which, when executed by the processor, causes the apparatus to perform acts in the method in the second aspect of the present disclosure.

In a sixth aspect of the present disclosure, there is provided an apparatus for supporting data replication of a virtual machine. The apparatus includes: a processor; and a memory coupled to the processor, the memory having an instruction stored therein which, when executed by the processor, causes the apparatus to perform acts in the method in the third aspect of the present disclosure.

In a seventh aspect of the present disclosure, there is provided a computer program product tangibly stored on a computer readable medium and including machine executable instructions which, when executed, causes a machine to perform the method in the first aspect of the present disclosure.

In an eighth aspect of the present disclosure, there is provided a computer program product tangibly stored on a computer readable medium and including machine executable instructions, which executed, causes a machine to perform the method in the second aspect of the present disclosure.

In a ninth aspect of the present disclosure, there is provided a computer program product, tangibly stored on a computer readable medium and including a machine executable instruction, which executed, when executed, causes a machine to perform the method in the third aspect of the present disclosure.

The Summary is to introduce a selection of concepts in a simplified form that are further described below in the Detailed Description. This Summary is not intended to identify key features or essential features of the claimed subject matter, nor is it intended to limit the scope of the claimed subject matter.

BRIEF DESCRIPTION OF THE DRAWINGS

The above and other objectives, features and advantages of example embodiments of the present disclosure will become more apparent, through the detailed description on example embodiments described herein with reference to the accompanying drawings, in which the same reference symbols generally represent the same components.

DETAILED DESCRIPTION OF IMPLEMENTATIONS

Figure 1:
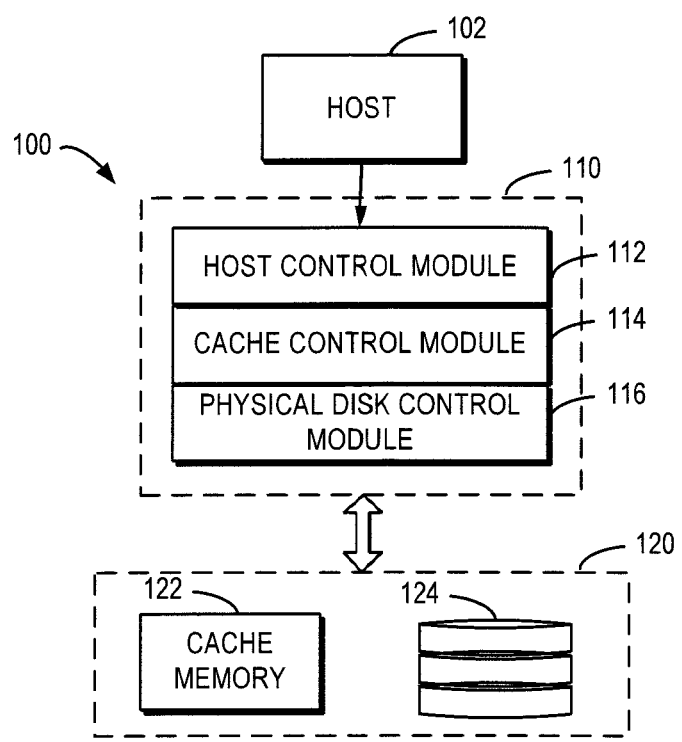
FIG. 1 illustrates a schematic diagram of an example environment in which some embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although the drawings illustrate preferred embodiments of the present disclosure, description of those embodiments is just to enable those skilled in the art to better understand and further implement example embodiments disclosed herein and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example implementation" and "an example implementation" are to be read as "at least one example implementation." The term "another implementation" is to be read as "at least one further implementation." The term "first," "second" or the like may denote different or the same objects. The following text may also contain other explicit or implicit definitions.

Reference is first made to FIG. 1, which shows a schematic diagram of an example environment in which the technical solutions of embodiments of the present disclosure may be implemented. The storage system 100 includes a physical storage device group 120 for providing a data storage capability. The physical storage device group 120 includes a cache memory 122 and a disk device 124. The cache memory 122 is used for data buffering, and the disk device 124 is used for persistent storage of data. Generally, an access speed for the cache memory 122 is greater than that for the hard disk device 124. The storage system 100 may utilize a variety of storage technologies to provide the data storage capability.

In some embodiments, examples of the cache memory 122 include memories having a higher access speed, such as caches, random access memory (RAM), dynamic random access memory (DRAM), or the like. Examples of the disk device 124 may include Redundant Arrays of Independent Drives (RAID) or other disk devices.

To manage data storage for physical storage space, the storage system 100 further includes a storage controller 110. Usually, the storage system 100 employs a hierarchical control model. As shown in FIG. 1, under the hierarchical control model, the storage controller 110 may have multiple layers of control modules, including a host control module 112, a cache control module 114, and a physical disk control module 116. These control modules implement hierarchical control functions.

To facilitate understanding of the hierarchical control model of the storage system 100, an operation mechanism of the controller 110 is described in an example using the RAID technology. The physical disk control module 116 presents a RAID volume (LUN) to the cache control module 114. The physical disk control module 116 controls the storage space of the disk device 124. The cache control module 114 controls the buffer space of the cache memory 122 to present a buffer volume to the host control module 112. The host control module 112 manages a logical storage pool and presents the pool LUN to the host 102.

On the host 102 can run various applications. In a scenario of a virtual machine application, a virtual machine service software, such as VMware, can be installed on the host 102, a plurality of virtual machines can be created using the VMware, and operating systems, such as Windows, UNIX, Linux or the like, can be installed on the virtual machines.

Upon operation, an application (for example a virtual machine) running on the host 102 sends a user write request to the host control module 112 to request that data be written to the storage system 100. In response to the received user write request, the host control module 112 may generate multiple write requests for the cache control module 114. For example, if the host 102's user write request requires writing a large amount of data into multiple discrete extents of a RAID volume created by the hard disk device 124, the host control module 112 sends a write request to the cache control module 114 for each extent.

The cache control module 114 and the cache memory 122 operate in a write back mode. This means that upon receipt of the write request, the cache control module 114 first buffers the data to be written by the write request to the cache memory 122 and then releases the data of the write request(s) to the disk device 140. The cache control module 114 may send an indication of completion of the write request to the host control module 112 after the data buffering is completed, thereby achieving a fast response to the user write request. The physical disk control module 116 is used to control an actual write to the hard disk device 124.

It should be understood that although illustrated above as different modules, the host control module 112, the cache control module 114 and the physical disk control module 116 may be implemented by a single or multiple processors, controllers, microprocessors having a processing capability or a computing device including these devices. In some examples, the cache control module 114 may further be integrated with the cache memory 122 to obtain a device which simultaneously has buffering and controlling capabilities. Although not shown, in some embodiments, the storage system 100 may further include another storage controller serving as a mirror of the storage controller 100 to provide data consistency, security, and data recovery capability. In some examples, the storage system 100 may also use a multi-core storage mechanism to implement data storage and management.

Figure 2:
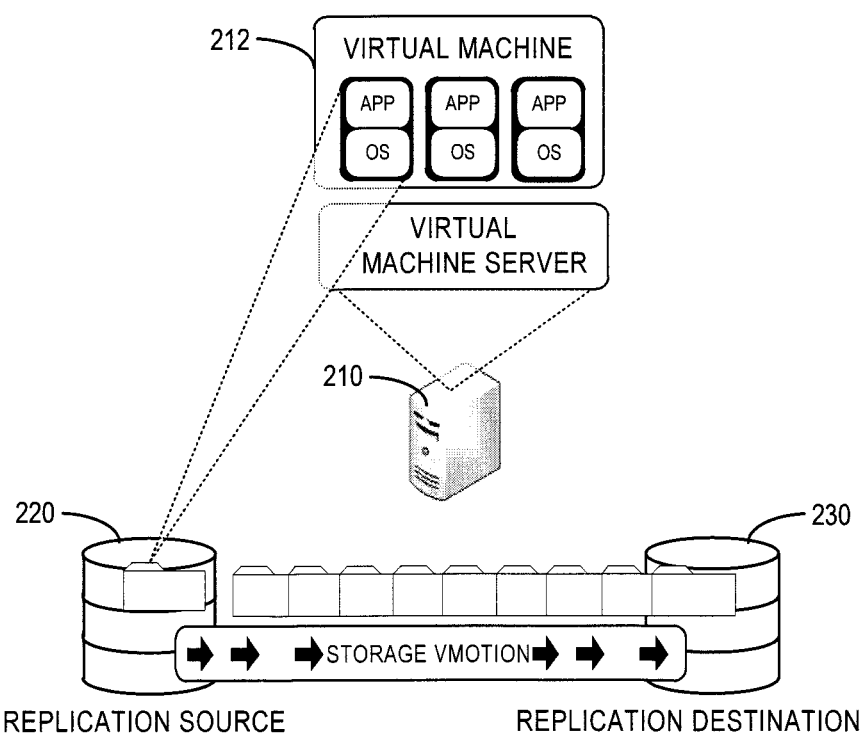
FIG. 2 illustrates data migration architecture in a Virtual Machine (VM) environment according to the prior art.

Next, reference will be made to FIG. 2 to describe data migration architecture in a Virtual Machine (VM) environment according to the prior art As shown in FIG. 2, in the architecture is included a virtual machine server 210, a replication source 220 and a replication destination 230. In the virtual machine server 210 runs server virtualization software, such as VMware by which a virtual machine 212 can be created using VMware. A plurality of operation systems (OSs) can be installed in the virtual machine 212, and various user applications (APPs) can run on respective OSs. Data related to the operation systems and applications of the virtual machine 212 are stored in the replication source 220, and when data migration is required, data may be replicated from the replication source 220 to the replication destination 230.

Data migration may occur in many cases. For example, when there is not enough storage space in the storage system or it is required to re-plan the use of the storage system, the data migration will be involved. At this point, data required to be migrated can be replicated from a replication source to a replication destination. The data migration can be implemented for example through VMware Storage VMotion in the VMware VMotion function. VMware VMotion is a migration solution provided by the VMware Corporation, which supports live migration of a running virtual machine from a physical server to a further physical server with zero downtime, continuous service availability, and computer transaction integrity. The VMware Storage VMotion is a part of the VMware VMotion function, which supports live migration of disk files of a running virtual machine within a storage array or across the storage arrays. The Storage VMotion can relocate the VM files, thereby simplifying storage array migration and storage database upgrades, dynamically optimizing storage I/O performance and improving the efficiency of storage capacity management. Meanwhile, the Storage VMotion makes use of the core technologies that the VMware has developed, such as disk snapshots, redo logs, parent/child disk relations, snapshot consolidation and the like.

Before moving disk files of a virtual machine, the Storage VMotion moves the "home directory" of the virtual machine to a new location. The "home directory" contains meta-information about the virtual machine, for example, configuration, swap, log files and the like. Then, "self VMotions" is moved to the new location of the VM home directory. The disk movements follow after the home directory migration. A virtual disk is replicated from the old storage device to a new storage device. After data movement is completed, the data consolidation happens within 2 seconds, which is usually so fast that it is unnoticeable to an application user.

If a database storage array supports a vStorage Array Integrated Application Interface (VAAI)/Virtual Volume (VVol), those disks replication operations can be offloaded into a storage array. VMotion calls the snapshot/clone/replication APIs directly to complete Virtual Machine Disk Format (VMDK) relocation operations. If the storage array does not support the functions, vSphere can use its native snapshot/data copy/snapshot consolidation to obtain the results, but it needs to consume more ESXi server computing resources and a higher networking capacity. By calling the VAAI/VVol of the storage array per se, snapshot/clone/migration can be offloaded to the storage side. Moreover, the native storage replication technologies can be used for replication with migration requirements, such as VMware VMotion and the like. Native Asynchronous Block and File Replication are appropriate for replication with a VMware environment requirement.

Figure 3:
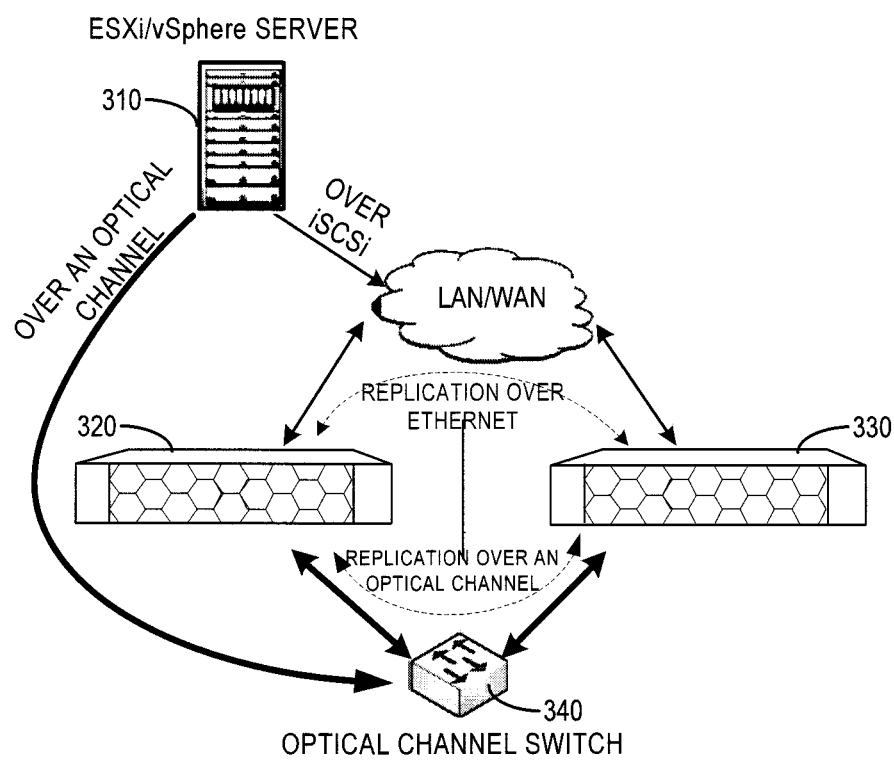
FIG. 3 illustrates storage system replication in a virtual environment according to some embodiments of the present disclosure.

However, as described in the background, in the existing replication method, the database is unable to perceive data types, and the VM storage procedure therefore is just the same as storage of general data, which has no difference from a database or text files actually. Typically, the traditional storage device is used as a dumb data box for application programs, and utilizes a bottom-up approach: first packaging a disk as LUNs, encapsulating them into volumes, and then allocating the LUNs or volumes to ports and data paths. Application programs use the LUNs via an Optical Channel (FC) or Internet Small Computer System Interface (iSCSI), or use it as a file system based on NFS/CIFS protocols. The same data replication can be implemented via FC or iSCSI, as shown in FIG. 3.

However, none of the above technologies can make the storage device be aware of the application programs and data types on the host system, or optimized based on corresponding application I/O pattern. Performance tuning of traditional disk arrays usually means that LUNs are created based on different performance characteristics, and LUNs are then mapped to ports, paths, servers and the final application load. Once the tuning is completed, the tuning solution is determined. If there is a new load increase, all tuning has to start from the beginning. For a VM application, it involves a similar issue that the storage system cannot directly perceive the application or data/file types, and it is hard to perform optimization.

In view of the above, in embodiments of the present disclosure, it is proposed to closely link the storage array with the application server, to achieve further performance improvement.

To the end, in some embodiments of the present disclosure, there is provided a data replication solution for a virtual machine. Based on the solution, an indication of changed data related information regarding a range and a type of the data change related to the virtual machine can be obtained at the virtual machine server via a data awareness module. When it is required to perform data migration, a part of workloads required by data replication can be offloaded to the storage system for execution, based on the changed data related information obtained through the data awareness function, and data replication optimization can be performed based on awareness of the types of the host applications and the replication data types. It means that locating of VMDK files, such as vMotion or the like, can be optimized using the changed data related information.

Hereinafter, some embodiments of the present disclosure will be described in detail with reference to FIGS. 4-12. However, it would be appreciated that the drawings and the embodiments illustrated therein are given for the purpose of illustration, and the present invention is not limited to details shown therein. To the contrary, the present invention can be implemented without these details or have various variants, without departing from the idea and spirits of the present disclosure.

Figure 4:
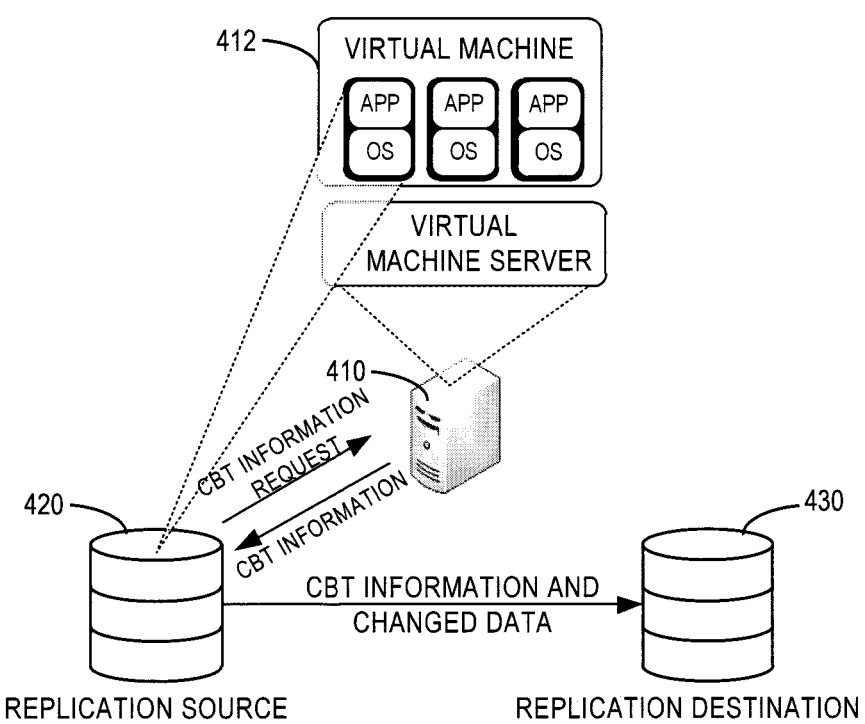
FIG. 4 illustrates system architecture for data replication of a virtual machine according to some embodiments of the present disclosure.

For the purpose of illustration, overall example architecture of a data replication system as proposed in the present disclosure will be described with reference to FIG. 4. FIG. 4 illustrates system architecture for data replication of a virtual machine according to some embodiments of the present disclosure. As shown in FIG. 4, the storage architecture includes a virtual machine server 410, a replication source 420 and a replication destination 430. The virtual machine server 410 hosts a virtual machine 412, a plurality of operation systems (OSs) can be installed on the virtual machine 412, and various applications (APPs) can run on respective OSs. The replication source 420 has data related to the operation systems and applications of the virtual machine stored therein. In particular, tracking for the changed data of the storage device can be performed at the virtual machine server 410. When it is required to perform data migration, the source storage 420 can send, upon receiving a data replication request for the virtual machine, an obtainment request for changed data tracking information to the virtual machine server 410, to obtain the changed data tracking information from the virtual machine server 410. The source storage 420 can obtain the corresponding changed data from a storage unit based on the changed data tracking information, and send the changed data tracking information and the obtained changed data together to the replication destination 430. At the replication destination 430, the changed data are replicated to corresponding data locations based on the changed data tracking information.

Figure 5:
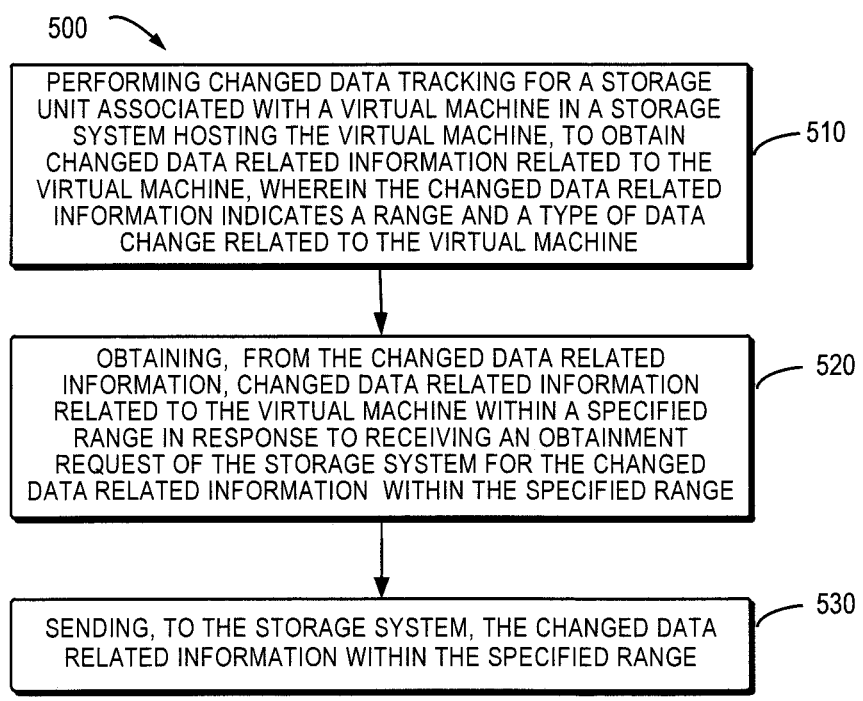
FIG. 5 illustrates a flowchart of a method 500 of supporting data replication of a virtual machine according to some embodiments of the present disclosure.

FIG. 5 illustrates a flowchart of a method 500 for supporting data replication of a virtual machine according to some embodiments of the present disclosure. Operations of the method 500 or at least a part thereof can be implemented by a virtual machine server (for example, an ESXi server).

At block 510, changed data tracking is performed on a storage unit associated with the virtual machine in the storage system, to obtain changed data related information related to the virtual machine. The changed data related information indicates the range and type of the data change related to the virtual machine.

Changed data tracking can be implemented by means of a Changed data Block Tracking (CBT) module. The virtual machine server system, such as VMware, is provided therein with a CBT function, which is configured to perform changed data block tracking on a Virtual Machine File System (VMFS). As such, changed disk sectors can be tracked at the virtual machine server. Moreover, the CBT function can be accessed by third-party applications. For example, changed data related information can be obtained based on a data protection framework of the virtual machine server. As an example, through an extended vStorage Application Programming Interface (VADP API) for data protection, VMkernel can be requested to return changed data of the virtual disk since the last snapshot. The extended VADP API will be described below in detail, which will not be elaborated herein. However, it should be noted that for other virtual machine servers without the CBT function, it is possible to particularly design a module having a changed data tracking function for performing changed data tracking in the present disclosure.

The changed data related information indicates data change of respective disk sectors, for example, the ranges and types of the respective data change, which can be in the form of tracking logs, for example. The data change range, for example can be indicated by a start address and a length (or an end address). The type of the data change includes, for example, addition and modification, wherein the addition indicates an additional change to the original data, while the modification means amendment to the original data. The changed data related information, for example, can be stored in a .ctk file associated with VMDK and the snapshot file in each virtual machine file folder.

Then, at block 520, from the changed data related information, changed data related information associated with the virtual machine within a specified range is obtained in response to receiving an obtainment request of the storage system for the changed data related information within the specified range. The storage system can specify the range of the changed data related information as requested. The specified range, for example, can define a time range of the changed data information, or define a storage unit range to which the changed data related information is related, applications to which the changed data related information is related, data types for the changed data related information or the like. As such, the virtual machine server can obtain from the tracked changed data related information as obtained, changed data related information corresponding to the specified range upon receiving, from the storage system, the obtainment request for the changed data related information within the specified range.

Subsequently, at block 530, the changed data related information within the specified range is sent to the storage system. Similarly, the changed data of the specified virtual disk can be returned based on the extended VADP API. The extended VADP API will be described below in detail, and therefore is omitted herein.

In some embodiments of the present disclosure, the virtual machine server can receive, from the storage system, a query request for a storage unit supporting the changed data tracking function; in response to the query request, information on the storage unit supporting the changed data tracking function in the storage system is queried; and a response to the query request is sent to the storage system, which includes the queried information on the storage unit. Herein, whether the storage unit supports the changed data tracking function means whether the storage unit can perform optimized data replication based on the changed data related information returned from the virtual machine server, rather than whether the storage unit per set can track its changed data. Therefore, all LUNs are not required to support changed data tracking; instead they can selectively support or do not support the changed data tracking function, based on the different types of application programs, or different types of stored data. The storage system can inquire the virtual machine server about which LUN supports the changed data tracking function. The virtual machine server has configuration information on respective LUNs, which can include configuration supporting or not supporting the changed data tracking function. The virtual machine server can search for the configuration information on the LUNs in the storage system to obtain information on the respective LUNs supporting changed data tracking, and send the information on the respective LUNs to the storage system as a response.

In some embodiments of the present disclosure, the virtual machine server can receive a changed data tracking function enabling request for a storage unit associated with the virtual machine from the storage system, and enable the changed data tracking function for the storage unit associated with the virtual machine in response to the changed data tracking function enabling request. In other words, in some embodiments of the present disclosure, the storage system can enable the changed data tracking function for the storage unit supporting the changed data tracking function. The changed data tracking function enabling request can be sent through the extended VADP API. The extended VADP API will be described below in detail, and therefore will not be elaborated herein.

Figure 6:
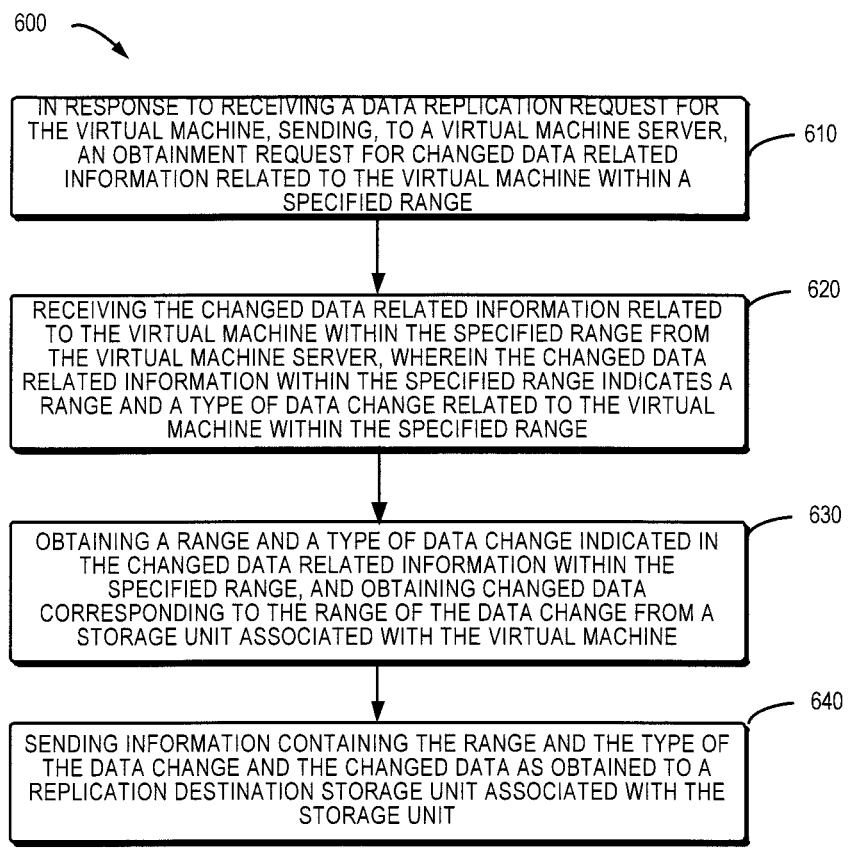
FIG. 6 illustrates a flowchart of a method 600 of performing data replication of a virtual machine according to some embodiments of the present disclosure.

FIG. 6 illustrates a flowchart of a method 600 for performing data replication of a virtual machine according to some embodiments of the present disclosure. Operations of the method 600 or at least part thereof can be implemented by a control device/controller of a storage system, in particular, a control module in a storage system including a replication source storage unit.

As shown in FIG. 6, at block 610, in response to receiving a data replication request for the virtual machine, an obtainment request for changed data related information related to the virtual machine within a specified range is sent to a virtual machine server. When it is required to perform data migration for a virtual machine, a system administrator can send a data replication request, for example, through a user operation interface of the virtual machine, without impacting real-time operation of the virtual machine. At this point, a storage system including a replication destination storage unit receives the data replication request, and in response to the data replication request, sends, by the extended VADP API, an obtainment request for changed data related information related to the virtual machine within a specified range. The extended VADP API will be described below in detail, and therefore will not be elaborated herein.

The changed data related information within the specified range includes information on changed data within the specific range. The specified range, for example, can define a time range of the changed data information, or define a storage unit range to which the changed data related information is related, applications to which the changed data related information is related, data types for the changed data related information or the like.

At block 620, the storage system receives changed data related information associated with the virtual machine within the specified range from the virtual machine server, wherein the specified changed data related information indicates the range and type of the data change within the specified range. Similarly, changed data of a specified virtual disk can be received based on the extended VADP API. The extended VADP API will be described below in detail, and therefore will not be elaborated herein.

At block 630, the storage system obtains the range and type of the data change from the received changed data related information, and fetches, from the storage unit associated with the virtual machine, the changed data corresponding to the range of the data change. The replication source storage system can obtain, based on the range of data change indicated in the received changed data related information, the corresponding changed data, i.e., the corresponding current data or changed data, from the corresponding storage unit. In addition, the storage system can generate, based on the data change range and the data change type, metadata data information and store the same in a repository.

At block 640, the storage system sends information containing the range and type of the data change, together with the obtained changed data, to a replication destination storage unit associated with the storage unit. The storage system including the replication destination storage unit replicates, based on the type of data change, the received changed data onto data portion corresponding to the range of data change. Herein, information containing the range and type of the data change can be the changed data related information received from the replication source storage system, or can be the range and the type of data change obtained through parsing, or those sent to the replication destination storage system as metadata.

According to some embodiments of the present disclosure, the replication source storage system can further send, to the virtual machine server, a query request for a storage unit supporting the changed data tracking function, and receive a response to the query request form the virtual machine server, wherein the response includes information on the storage unit supporting the tracked data tracking. Herein, whether the storage unit supports the changed data tracking function means whether the storage unit can perform optimized data replication based on the changed data related information returned from the virtual machine server, rather than whether the storage unit per set can track its changed data. Therefore, in a storage system, all LUNs are not required to support changed data tracking; instead they selectively support, or do not support the changed data tracking function, based on the different types of application programs, or different types of stored data. The storage system can inquiry the virtual machine server about which LUN supports the changed data tracking function. Similarly, changed data of the specified virtual disk can be received based on the extended VADP API. The extended VADP API will be described below in detail, and therefore is omitted herein.

According to some embodiments of the present disclosure, the storage system can further send, to the virtual machine server, a changed data tracking function enabling request for the storage unit associated with the virtual machine. In other words, in some embodiments of the present disclosure, the storage system can enable the changed data tracking function for the storage unit supporting the changed data tracking function. Similarly, the changed data tracking function enabling request can be sent through the extended VADP API. The extended VADP API will be described below in detail, and therefore will not be elaborated herein.

Figure 7:
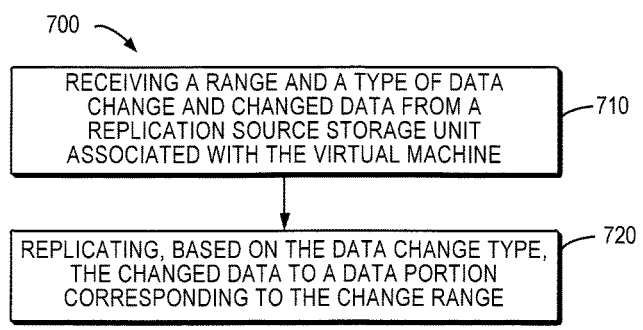
FIG. 7 illustrates a flowchart of a method 700 of performing data replication of a virtual machine according to some other embodiments of the present disclosure.

FIG. 7 illustrates a flowchart of a method 700 for performing data replication of a virtual machine according to some embodiments. Operations of the method 700 or at least a part thereof can be implemented by a control device/controller of the storage system, in particular, a control module in a storage system including a replication destination storage unit.

As shown in FIG. 7, at block 710, the replication destination storage system receives information containing a range and a type of data change, and changed data. The data change is related to the replication source storage unit of the virtual machine. Then, at block 720, based on the type of data change, the changed data are replicated to a data portion corresponding to the change range. In the way, it is not necessary to replicate the entire data, but only the changed portion is required to be replicated, thereby reducing bandwidth usage, improving the replication efficiency, and shorting time for data migration.

Figure 8:
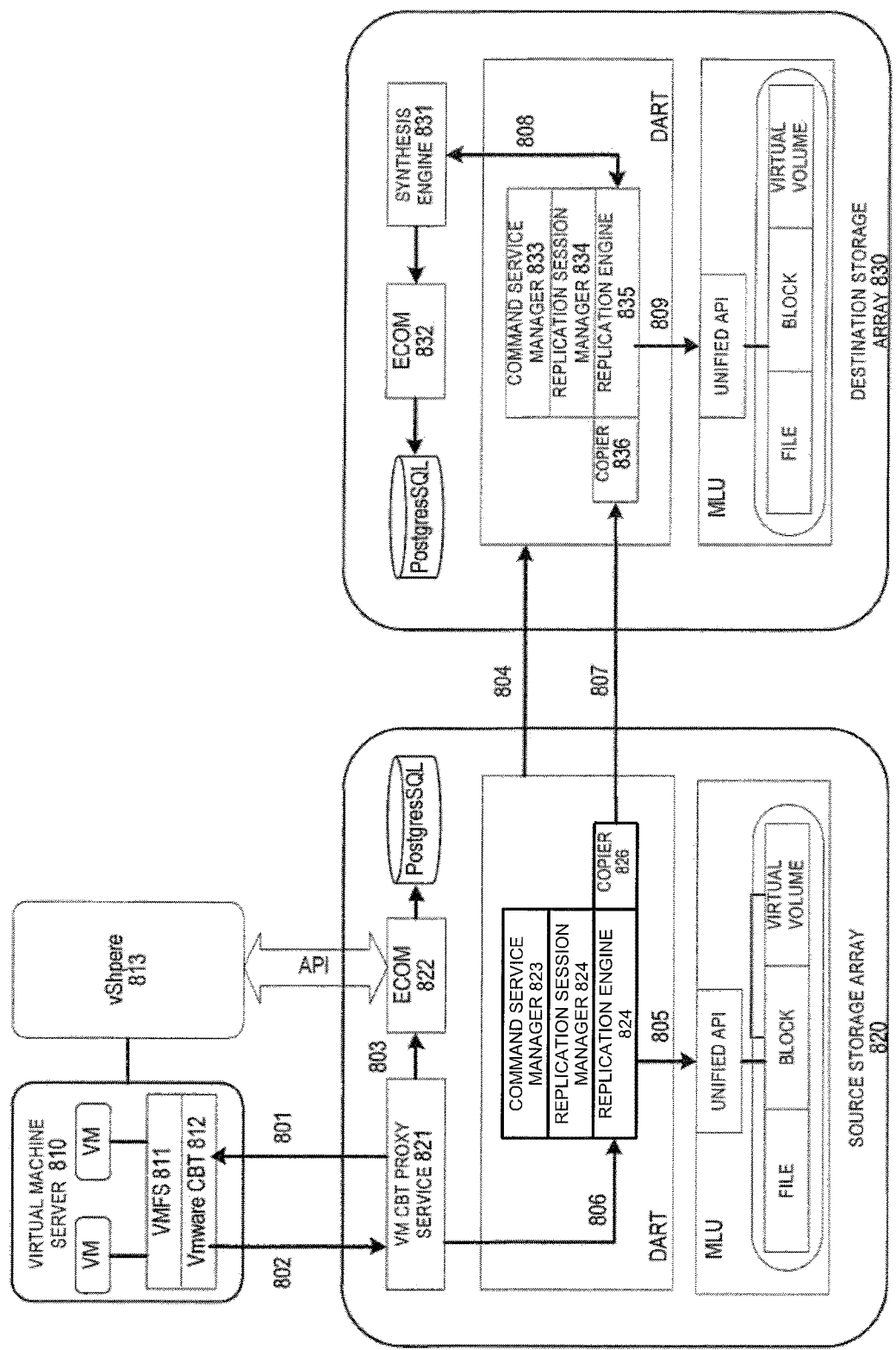
FIG. 8 illustrates example architecture of a data replication system according to embodiments of the present disclosure.

For the purpose of illustration, FIG. 8 illustrates example architecture of a data replication system according to embodiments of the present disclosure. However, it would be appreciated that it is provided merely as an example and the present invention is not limited thereto, and various modification, addition and deletion may be made according to the needs of the actual applications.

As shown in FIG. 8, in the system architecture, there are a virtual machine server 810, a source storage array 820 and a destination storage array 830. The entire architecture as shown in FIG. 8 is similar to the one in FIG. 1, but includes more detailed implementation.

The virtual machine server 810 is, for example, a VMware ESXi server which can host a plurality of virtual machines VM and include a Virtual Machine File System (VMFS) 811 and a VMware Changed Data Block Tracking (CBT) module 812. The virtual machine server further includes therein a server virtualization application 813, such as vSphere provided by the VMware. It is particularly to be noted that the CBT 811 of the VMware is configured to perform VMFS changed data block tracking, which can, for example, store the change tracking information in a .ctk file associated with vmdk and a snapshot file in each virtual machine folder. As such, change tracking of disk sectors can be performed on the virtual machine running on the virtual machine server. The CBT function is a part of data protection provided by the VMware vSphere, and can be accessed by a third-party application. Hence, changed data tracking information (changed data related information) can be obtained through the extended API of the VADP. For example, the VADP can be called to request the VMkernel to return the changed data on the virtual disk since the last snapshot. However, it should be noted that in other virtual machine servers without the CBT function, it is also possible to particularly design a module having a changed data tracking function for performing changed data tracking in the present disclosure.

The source storage array 820 includes a VM CBT proxy service module 821, an EMC common object manager (ECOM) 822, a repository PostgreSQL, DART, a mapped LUN module (MLU) and a unity API assembly. The VM CBT proxy service module 821 resides in the source storage array 820, and is configured to obtain and parse the changed data tracking information from the virtual machine server 710, and store the parsed changed state information and other metadata into an embedded PostgreSQL database. The ECOM 822 is a Web service application program in a VNX control path for providing management, metadata persistence, command request processing and interface management.

DART is a data movement container of the storage array, which includes various functional components for data replication. These functional components include a command service manager 823, a replication session manager 824, a replication engine 825 and a copier module 826. The command service manager 823 is one of replication functional components of the storage array. Each data replication user command is processed in the command service manager 823, to drive the replication actions on a replication session by coordinating with a remote site. The replication session manger 824 is configured to manage a persistent replication session object, and monitor a Recovery Point Object (RPO) specified by the user by monitoring I/O throughput of a source storage array. The replication session manager is also responsible for coordinating storage resource configuration/attributes/state changes with a destination system and destination resources. The replication engine 825 is a core component of the replication function, and is configured to replicate resources in a unified manner and perform directly coordination among various modules. The copier 826 is configured to be used by the replication engine 825, to perform data transmission and throttling via a network between the source storage array 820 and the destination storage array 830. When the RPO has expired, the source storage array 820 establishes a RCP/TCP connection with the destination storage array 830, and then, data are read from the source storage system by calculating differences between the data of the two systems.

MLU represents a framework of a thin provisioning volume accessible for the DART, which hides details of the files/data blocks/virtual volume objects of lower stacks. The replication component in the data path container DART can interact with the MLU via the unified API. The unified API is configured to set different attributes of the storage resources and a life cycle for an access system creating a snapshot. The unified API can further provide synchronous/asynchronous semantics required for data path container components.

The destination storage array 830 has substantially the same structure as the source storage array 820 does, and includes an EMC common object manager 832, a repository PostgreSQL, DART, a mapped LUN module (MLU) and a unified API component. The difference therebetween lies in that the destination storage array 830 includes a synthesis engine 831 but excludes a VM CBT proxy service module. Amongst others, the ECOM 832, the command service manger 833 in the DART, the replication session manager 834, the replication engine 835 and the copier module 836 substantially correspond to the ECOM 822, the command service manager 823 in the DART, the replication session manager 824, the replication engine 825 and the copier module 826 in the source storage array, respectively, and a difference thereof lies in that it is located at a side of the destination storage array 830 and responsible for performing a replication operation in response to a request from the source storage array 820. For detailed operations thereof, reference may be made to relevant description regarding the source storage array 820, and they will not be elaborated herein.

The synthesis engine 831 in the destination storage array 830 can receive changed data block tracking information from the replication engine 835, synthesize, based on the changed data block tracking information, the changed data and the data content previously replicated to the side, and send the entire synthesized file (for example, the VMDK file) to the replication engine 835. The synthesis engine can have a further function of recording the corresponding state and metadata via the ECOM to the embedded PostgreSQL repository at the destination storage array.

By means of the VMware CBT module 812 in the virtual machine server 810, changed data tracking for a virtual machine can be implemented. Upon receiving a data replication request for a virtual machine, changed data tracking information can be requested from the virtual machine server 810 (801) by means of the VM CBT proxy service module 821 in the source storage array. In response to the request for the changed data tracking information, the virtual machine server 810 sends changed data block tracking information to the source storage array 820 (802). After receiving the changed data block tracking information, the VM CBT proxy service module 821 can send the changed data information to the ECOM (803), and the ECOM combines and parses the changed data block tracking information on the virtual machine and other related information metadata, and then store the same into the PostgreSQL repository. Next, the source storage array 820 creates and verifies resources of both parties, which is implemented through communication with the destination storage array 830 (804). If the resources of both parties are available, the process continues. At this point, the replication engine 825 can call the unified API to obtain the corresponding changed data (805), for example, LUN/SNAP data, and configure a backend object correspondingly. Then, the data replication procedure is started. If it is performed the first time, the changed data obtained should be empty, and the whole associated data file (VMDK file) therefore is sent to the destination storage array; if it is not performed the first time, it means that the storage unit includes an early version of the previous replication, and at this point only the obtained changed data and the parsed metadata (a range, type and the like, of data change) can be transferred to the replication engine 825 (806). The replication engine uses the copier 826 to start data replication, and the copier 826 transmits the changed data, metadata and the like to the copier 836 in the destination storage array 830 (807). Subsequently, the replication operation starts at the replication destination storage array 830. If it is a first data transmission, the replication engine performs processing by following common operations. If it is not the first data transmission, the synthesis engine retrieves the changed data block from the storage unit, records the corresponding metadata of a list of virtual disk extents, and performs synthesis using the VMDK/snap from the latest data transmission (808). The updated metadata are recorded into the PostgreSQL repository, and the full VMDK data file will be flushed into a MLU backend object after the replication engine calls the unified API.

According to some embodiments of the present disclosure, in order to support communication between the virtual machine server and the source storage array, some APIs can be defined to extend the original VASA API set for storage awareness, to implement VMware application program awareness. The VASA API is a dedicated API set for storage awareness (VASA), and the storage system can obtain, via the API therein, a virtual volume and its association with a related virtual machine. Through VASA, a two-way out-of-band communication can be established between vSphere and the storage system at the underlying layer, to perform data service, and some operations of the virtual machine can be offloaded to the storage system. The virtual machine server/vSphere can manage the storage arrays via VASA APIs.

The VASA APIs are designed for the VVol function. In order to support end-to-end VVol, both the source storage array and the destination storage array can be additionally provided with VVol to enable the storage arrays to support the VVol API of the VMware. Calling of these APIs are recited in the VASA 2.0 program guide. These APIs can be implemented in a storage device of a vendor/partner, such as a VNX array embedded software stack, thereby enabling the VVol to work well for VMware vSphere. In other words, the storage array, such as VNX Unity, can support VASA 2.

Figure 9:
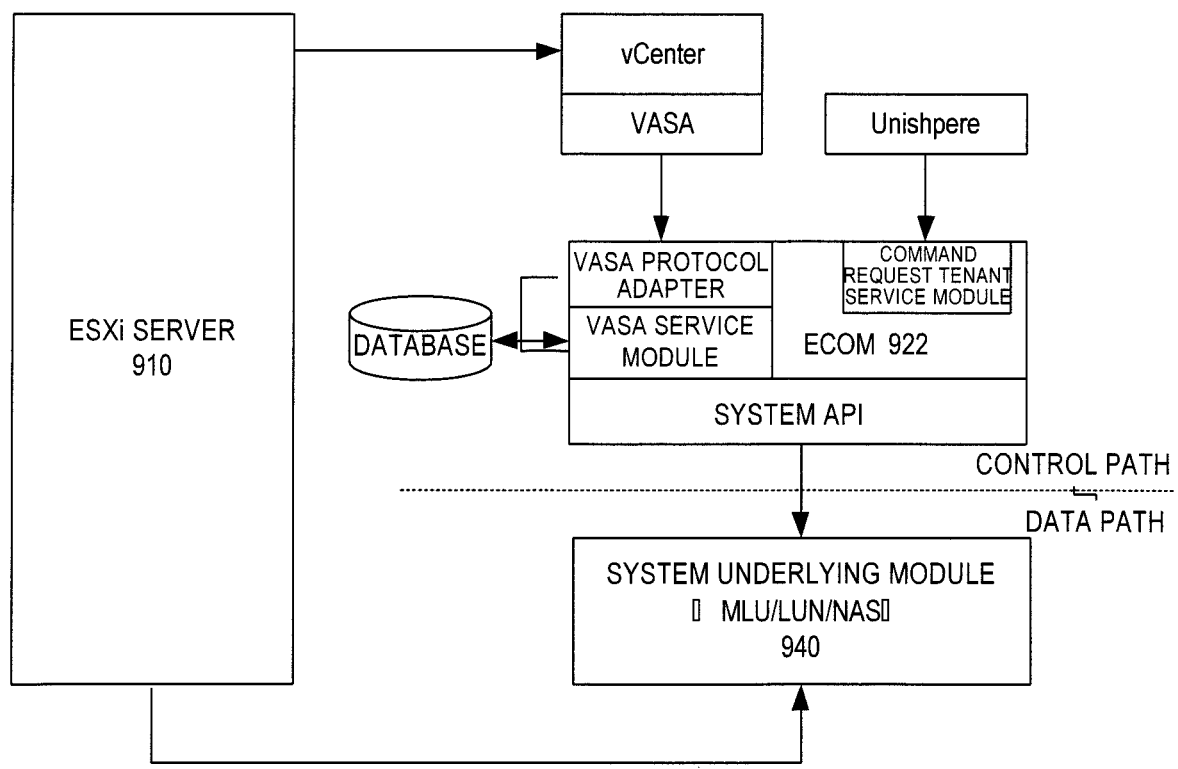
FIG. 9 illustrates a diagram of architecture enabling a Virtual Volume (VVol)/a Virtual Storage Application Programming Interface (VASA API) for storage awareness to support a VNX storage system of EMC Corporation.

FIG. 9 illustrates a diagram for VVol/VASA API supporting a VNX storage device according to embodiments of the present disclosure. VASA modules are provided in both ESXi servers and vCenter. Either of them can send VASA requests to the Vendor Provider (VP) module. Requests from ESXi or vCenter are SOAP protocol requests that are handled by the VASA Protocol Adaptor. These requests are then routed to the VASA Providers which interact with their database and the layered drivers for performing Virtual Volume operations.

ECOM is a management interface of a VNX storage device. A front-end management interface is exposed through a single IP address bonded to both service modules. The ECOM routes the requests to the respective components, according to ports and Unified Resource identifiers (URIs). A VASA providing program in the ECOM forwards incoming requests from the vCenter/ESXi server to appropriate service modules based on URLs. This service module contains application program logic external to the data path required to complete a confirmation command. It uses the SYSAPI (System API, namely a module of ECOM) to access back-end data and has notifications responded for callback. Care must be taken in developing callback functions to ensure that they are non-blocking as these callbacks are serialized and any blocking call can cause serious performance degradation.

In the ECOM, each of MLU/Hostside/FLARE/NAS is the data path of the VNX storage, which is connected with the ESXi server as a backend storage pool provider via Block IO, NAS and VAAI.

Besides the existing VASA APIs that are described in the VASA 2 program guide, it is proposed to create new extended APIs, in some embodiments of the present disclosure, to facilitate communication between the virtual machine server and the storage array. Several example VADP extended APIs for storage awareness will be given below.

API Name: retrieveStorageLunCBT
Requesting to return CBT information on a LUN
Function Signature:
Boolean retrieveStorageLunCBT(String[ ] volId)
Returning Value:
Returning CTB information within a specified range Faults:
InactiveProvider, InvalidSession, NotImplemented, StorageFault, TooMany, and VasaProviderBusy Using the setStorageLunCBT function, the server can be requested to return the CBT information within the specified range.
API Name: queryStorageLunCBT
Returning a LUN in a storage supporting CBT
Function Signature:
Boolean queryStorageLunCBT(String[ ] volId)
Returning Value:
Returning a flag if the LUN supports CBT
Faults:
InactiveProvider, InvalidSession, NotImplemented, StorageFault, TooMany, VasaProviderBusy
Using the queryStorageLunCBT function, the server can be requested to return flag storage LUNs having specified object IDs, whose CBT function can be enabled. If any of volume identifiers is invalid, no result will be retuned for the queryStorageLunCBT.
API Name: setStorageLunCBT
Setting CBT of a LUN in a storage system enabled
Function Signature:
Boolean setStorageLunCBT(String[ ] volId)
Returning Value:
Returning a flag if CBT is set for the LUN
Faults:
InactiveProvider, InvalidSession, NotImplemented, StorageFault, TooMany, VasaProviderBusy
NoMovementProvidngProgram, InvalidSession, NoIndication, StorageFault, TooMany, VasaPproviderBusy
Description:
The setStorageLunCBT function sets the specified LUN with an object ID as CBT enabled. If any of volId is null or invalid, the setStorageLunCBT returns no result.

The storage system Unity and the virtual machine ESXi server/vSphere could use the above functions to get/set/query the CBT.

Figure 10:
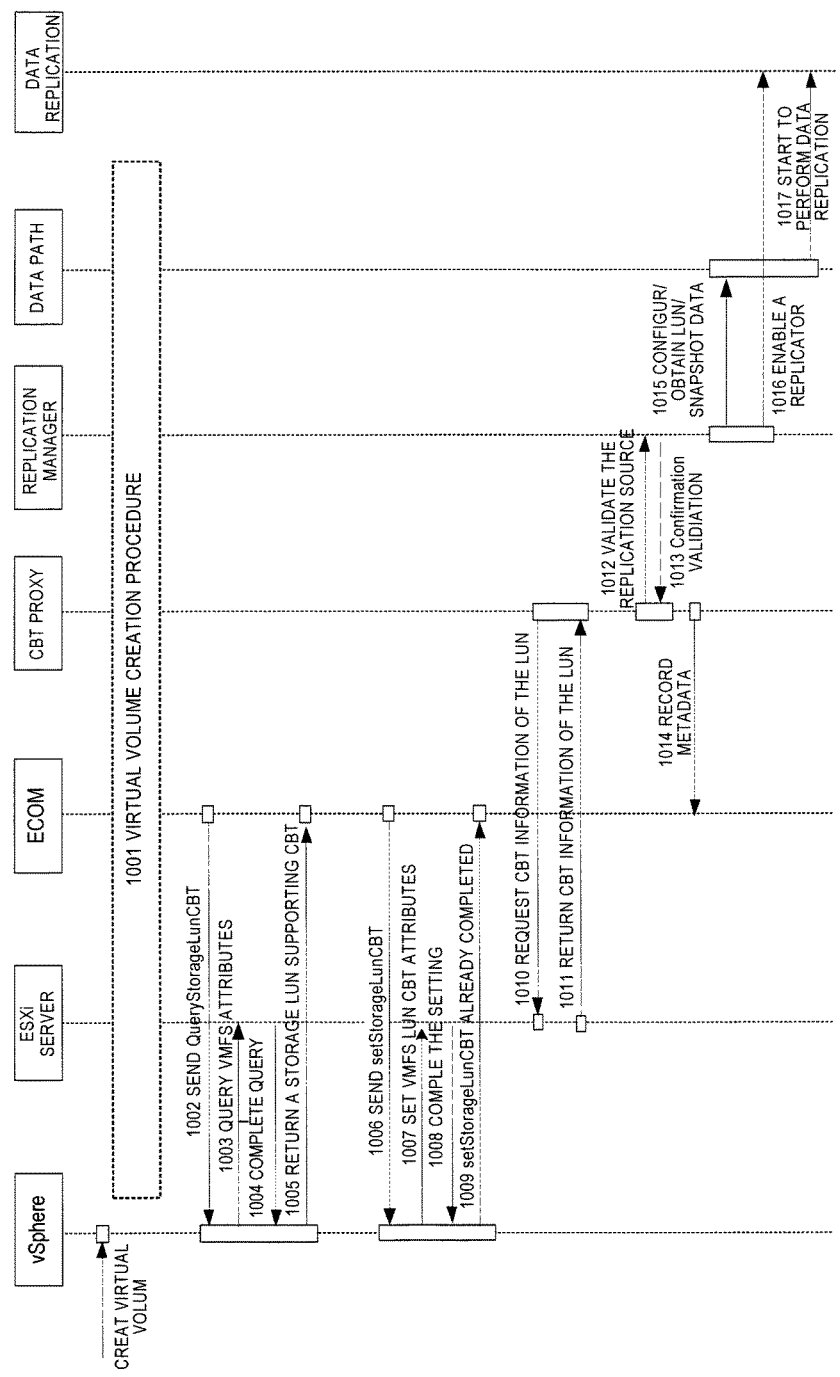
FIG. 10 illustrates a flowchart of processing of various modules of a replication source storage system and a virtual machine server according to some embodiments of the present disclosure.

FIG. 10 illustrates a diagram of processing of various modules of a virtual machine server and a replication source storage system according to some embodiments of the present disclosure. It would be appreciated that the procedure is provided merely as an example and the present disclosure is not limited thereto but may have various variants according to needs of actual applications.

As shown in FIG. 10, upon receiving a request for creating a virtual volume, vSphere starts a procedure of creating a virtual volume (1001). After creating the virtual volume is completed, the ECOM in the corresponding storage array can send, via a VADP extended API "queryStorageLunCBT", a query request for a storage unit supporting a changed data tracking function to the vSphere (1002). The vSphere queries VMFS attributes with the virtual machine ESXi server (1003), and after completing the query, the ESXi server then sends the query information to the vSphere (1004). The vSphere returns the storage LUN supporting CBT to the ECOM (1005). Subsequently, the ECOM can send, via a VADP extended API "setStorageLunCBT", a request for enabling the CBT function of the LUNs to the vSphere (1006). The vSphere requests the ESXi server to perform VMFS LUN CBT attribute setting (1007). After the attribute setting is completed, an acknowledgement message is sent to the vSphere (1008), and the vSphere then sends, to the ECOM, an acknowledgement message that setStorageLunCBT has been completed (1009).

When data replication is needed, the CBT proxy service can request CBT information on a LUN within a specified range from the ESXi server via the extended interface "retrieveStorageLunCBT" (1010), and the ESXi server obtains the corresponding CBT information and then returns the same to the CBT proxy service (1011). Next, the CBT proxy module sends a message to the replication manager to valid the replication source (1012), and records metadata information related to the changed data and the data replication (1014), after receiving a confirmation from a replication manager (1013). The replication manager then obtains corresponding LUN/snapshot data (1015). Subsequently, the replication data copier is started (1016), and data replication is begun on the data path (1017), i.e., it starting to send the LUN/snapshot data, as well as metadata related to the CBT and metadata related to data replication, to the replication destination storage system.

Figure 11:
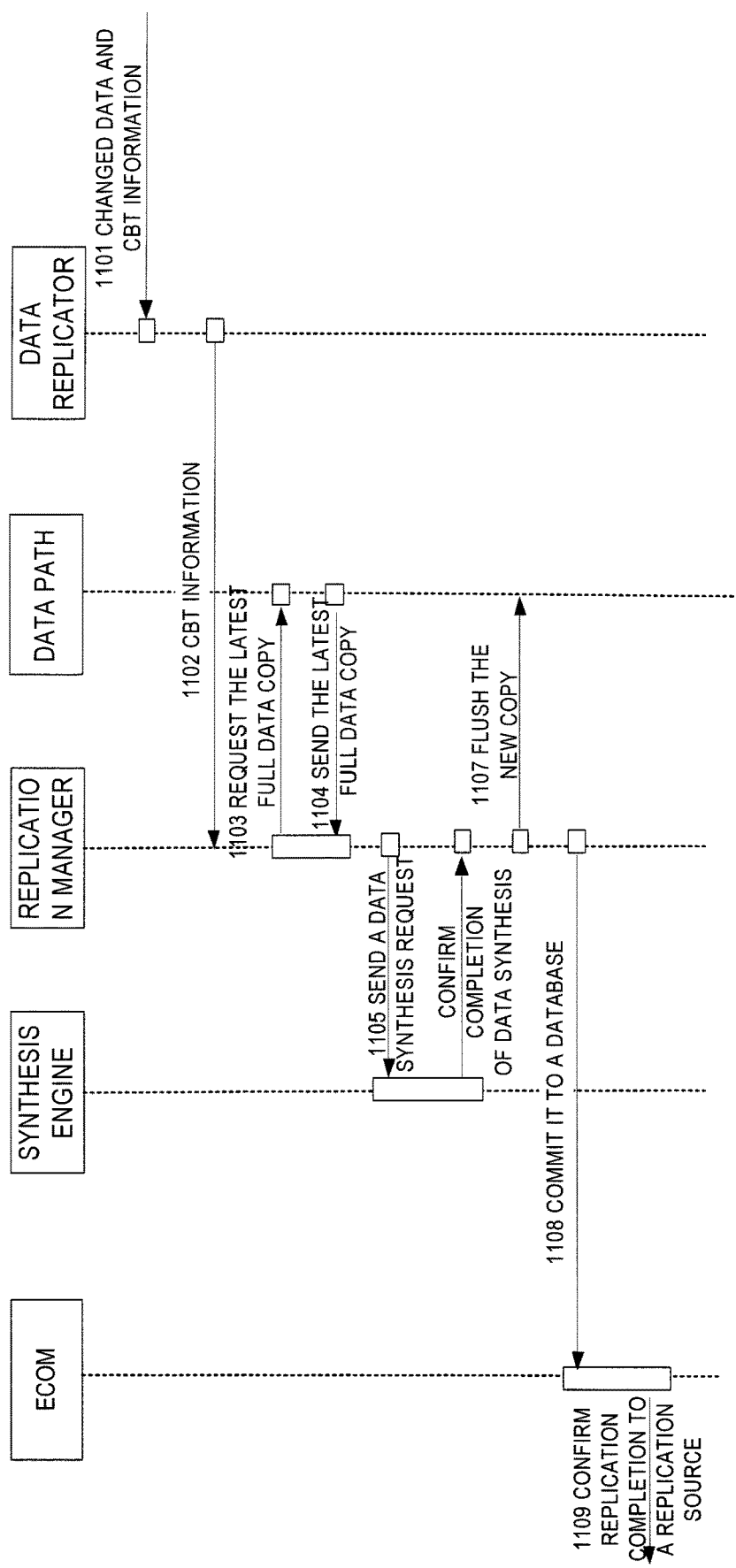
FIG. 11 illustrates a flowchart of processing of various modules of a replication destination storage system according to some embodiments of the present disclosure.

FIG. 11 illustrates a flowchart of processing of various modules of a replication destination storage system according to some embodiments of the present disclosure. It would be appreciated that the procedure is given merely as an example, to which the present disclosure is not confined, and various variants are allowed according to actual application needs.

As shown in FIG. 11, the data copier receives changed data and CBT information from a replication source storage system (1101), and then sends the obtained CBT information to a replication manager (1102). The replication manager requests the latest full data copy from the data path (1103), and after receiving the last full data copy (1104), sends the CBT information, changed data and latest full data to a synthesis engine (1105). The synthesis engine performs data synthesizing operation and returns the full synthesized file to the replication manager (1106). The replication manager then flushes the full file to the data path (1107) and requests the ECOM to store the metadata into the repository (1108). Thereafter, a confirmation on completion of data replication is returned to the ECOM replication source storage system (1109).

Figure 12:
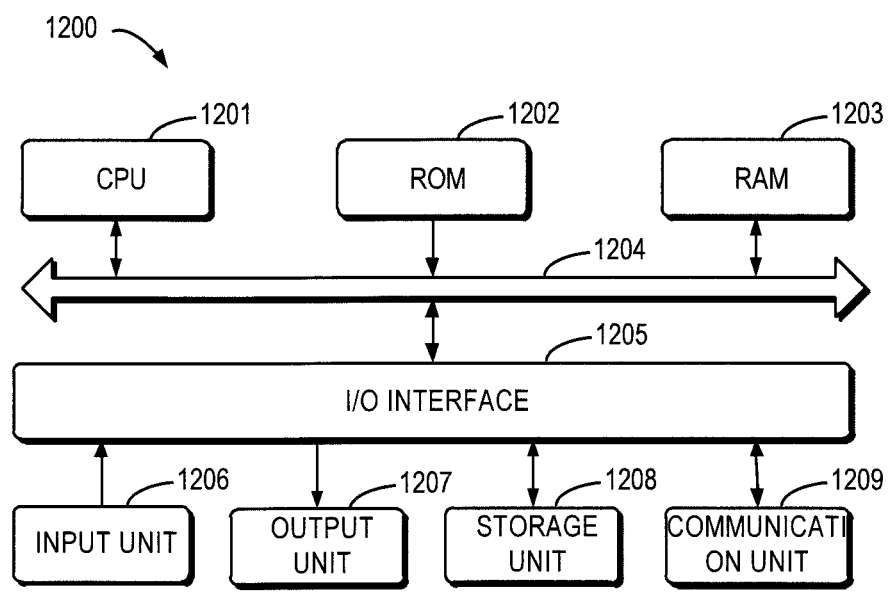
FIG. 12 illustrates a schematic diagram of an example device 1200 which can be used to implement embodiments of the present disclosure.

Moreover, FIG. 12 illustrates a schematic block diagram of an example device 1200 that can be used to implement some embodiments of the present disclosure. The device 1200 can be used to implement one or more control modules of the storage controller 110 in FIG. 1.

As shown, the device 1200 includes a central processing unit (CPU) 1201 which performs various appropriate acts and processing, based on a computer program instruction stored in a read-only memory (ROM) 1202 or a computer program instruction loaded from a storage unit 1208 to a random access memory (RAM) 1203. The RAM 1203 stores therein various programs and data required for operations of the device 1200. The CPU 1201, the ROM 1202 and the RAM 1203 are connected via a bus 1204 with one another. An input/output (I/O) interface 1205 is also connected to the bus 1204.

To the I/O interface 1205 are connected multiple components in the device 1200, including: an input unit 1206 such as a keyboard, a mouse and the like; an output unit 1207 such as various kinds of displays and a loudspeaker, etc.; a storage unit 1208 such as a magnetic disk, an optical disk, and etc.; a communication unit 1209 such as a network card, a modem, and a wireless communication transceiver, etc. The communication unit 1209 allows the device 1200 to exchange information/data with other devices through a computer network such as the Internet and/or various kinds of telecommunications networks.

Various processes and processing described above, e.g., any one of the method 500, the method 600, the method 700, the procedure in FIG. 10 and the procedure in FIG. 11, may be performed by the processing unit 1201. For example, in some embodiments, any one of the method 500, the method 600, the method 700, the procedure in FIG. 10 and the procedure in FIG. 11 may be implemented as a computer software program that is tangibly included in a machine readable medium, e.g., the storage unit 1208. In some embodiments, part or all of the computer programs may be loaded and/or installed onto the device 1200 via ROM 1202 and/or communication unit 1209. When the computer program is loaded to the RAM 1203 and performed by the CPU 1201, one or more steps of the method 500, the method 600, the method 700, the procedure in FIG. 10 and the procedure in FIG. 11 as described above may be performed. Alternatively, in other embodiments, the CPU 1201 can be configured to perform any one of the method 500, the method 600, the method 700, the procedure in FIG. 10 and the procedure in FIG. 11, in any other appropriate manner (for example, by means of firmware).

It should be appreciated by those skilled in the art that each step of the method according to the present disclosure may be implemented by a general computing device, they may be integrated on a single computing device or distributed over a network including multiple computing devices, alternatively, they may be embodied by executable program code of the computing device, such that they can be stored in a storage device and performed by the computing device, or they can be respectively fabricated as respective integrated circuit modules, or multiple modules or steps therein can be fabricated as a single integrated circuit module for implementation. In this way, the present disclosure is not limited to any particular combination of hardware and software.

It should be appreciated that, though several devices or sub-devices of the apparatus are mentioned in the above detailed description, this partition is only by way of example but not mandatory. In fact, according to embodiments of the present disclosure, two or more features and functions of the device as described above may be implemented in one device. On the contrary, one feature and function of the device as described above may be further partitioned and implemented by multiple devices.

What are described above are only optional embodiments of the present disclosure and not intended to limit the present disclosure, and those skilled in the art could appreciate that the present disclosure may have various modifications and changes. any modification, equivalent replacement, improvement, etc., made within the spirit and principle of the present disclosure, shall all be included in the protection scope of the present disclosure.

We claim:

1. A method of supporting data replication of a virtual machine, comprising:
    performing, by a virtual machine server for a source storage unit associated with a virtual machine in a storage system, changed data tracking to obtain changed data related information related to the virtual machine, the storage system including a source storage array and a destination storage array, the changed data related information indicating a type of data change related to the virtual machine, the type of data change including one or more of a data addition and a data modification;
    obtaining, by the virtual machine server from the changed data related information, changed data related information related to the virtual machine indicating the type of data change within a specified range in response to receiving, from the source storage array, an obtainment request for the changed data related information within the specified range; and
    offloading a workload required by the data replication from the virtual machine server to the source storage array based on the changed data related information within the specified range, the offloading of the workload including sending, by the virtual machine server, the changed data related information indicating the type of data change within the specified range to the source storage array, the source storage array being configured, in response to the offloading of the workload to the source storage array, to optimize the data replication by obtaining changed data from the source storage unit based on the type of data change, and sending the obtained changed data and the changed data related information within the specified range to the destination storage array.

2. The method of claim 1, further comprising:
    receiving a query request for the source storage unit supporting a changed data tracking function from the storage system;
    in response to the query request, querying information on the source storage unit supporting the changed data tracking function in the storage system; and
    sending a response to the query request to the storage system, the response containing queried information on the source storage unit.

3. The method of claim 2, further comprising:
    receiving a changed data tracking function enabling request for the source storage unit associated with the virtual machine from the storage system; and
    in response to the changed data tracking function enabling request, enabling the changed data tracking function for the source storage unit associated with the virtual machine.

4. The method of claim 3, wherein at least one of receiving the obtained request and sending changed data related information within the specified range is performed based on an extended application program interface of a data protection framework of a virtual machine server.

5. The method of claim 3, wherein at least one of receiving the query request and sending the response is performed based on an extended application program interface of a data protection framework of a virtual machine server.

6. The method of claim 3, wherein receiving the changed data tracking function enabling request is performed based on an extended application program interface of a data protection framework of a virtual machine server.

7. A method of performing data replication of a virtual machine, comprising:
    in response to receiving a data replication request for a virtual machine, sending, by a source storage array to a virtual machine server, an obtainment request for changed data related information related to the virtual machine within a specified range, the virtual machine server being configured to offload a workload required by the data replication to the source storage array based on the changed data related information within the specified range;
    receiving, at the source storage array in response to offloading the workload to the source storage array, the changed data related information indicating a type of data change within the specified range from the virtual machine server, the type of data change including one or more of a data addition and a data modification;

obtaining, by the source storage array, the type of data change indicated in the changed data related information within the specified range;

optimizing, by the source storage array, the data replication by obtaining changed data from a source storage unit associated with the virtual machine based on the type of data change; and sending, by the source storage array, the obtained changed data and the changed data related information within the specified range to a destination storage array.

8. The method of claim 7, further comprising:

forming, based on the changed data related information within the specified range, metadata information related to data replication and storing it into a repository.

9. The method of claim 7, further comprising:

sending, to the virtual machine server, a query request for the source storage unit supporting a changed data tracking function; and receiving a response to the query request from the virtual machine server, the response containing information on the source storage unit supporting changed data tracking.

10. The method of claim 9, further comprising:

sending, to the virtual machine server, a changed data tracking function enabling request for the source storage unit associated with the virtual machine.

11. The method of claim 10, wherein at least one of sending the obtained request and receiving the changed data related information within the specified range is performed based on an extended application program interface of a data protection framework of a virtual machine server.

12. The method of claim 10, wherein at least one of sending the query request and receiving the response is performed based on an extended application program interface of a data protection framework of a virtual machine server.

13. The method of claim 10, wherein sending the changed data tracking function enabling request is performed based on an extended application program interface of a data protection framework of a virtual machine server.

14. A method of performing data replication of a virtual machine, comprising:

receiving, at a destination storage array from a source storage array, changed data and changed data related information within a specified range, a workload required by the data replication being offloaded from a virtual machine server to the source storage array based on the changed data related information within the specified range, offloading of the workload including sending, by the virtual machine server, the changed data related information indicating a type of data change within the specified range to the source storage array, the type of data change including one or more of a data addition and a data modification, the data change being associated with a source storage unit of a virtual machine, the source storage array being configured, in response to the offloading of the workload to the source storage array, to optimize the data replication by obtaining changed data from the source storage unit based on the type of data change; and replicating, by the destination storage array based on the type of data change, the changed data to a data portion of a destination storage unit corresponding to the specified range.

15. An apparatus for supporting data replication of a virtual machine, comprising:

a processor; and a memory coupled to the processor, the memory having instructions stored therein, the instructions when performed by the processor causing the apparatus to perform acts of:

performing, for a source storage unit associated with a virtual machine in a storage system, changed data tracking to obtain changed data related information related to the virtual machine, the storage system including a source storage array and a destination storage array, wherein the changed data related information indicates a type of data change related to the virtual machine, the type of data change including one or more of a data addition and a data modification;

obtaining, from the changed data related information, changed data related information related to the virtual machine within a specified range, in response to receiving, from the source storage array, an obtainment request for the changed data related information within the specified range; and offloading a workload required by the data replication to the source storage array based on the changed data related information within the specified range, the offloading of the workload including sending, to the source storage array, the changed data related information indicating the type of data change within the specified range, the source storage array being configured, in response to the offloading of the workload to the source storage array, to optimize the data replication by obtaining changed data from the source storage unit based on the type of data change, and sending the obtained changed data and the changed data related information within the specified range to the destination storage array.

16. An apparatus for performing data replication of a virtual machine, comprising:

a processor; and a memory coupled to the processor, the memory having instructions stored therein, the instructions when performed by the processor causing the apparatus to perform acts of:

in response to receiving a data replication request for a virtual machine, sending, to a virtual machine server, an obtainment request for changed data related information related to the virtual machine within a specified range, the virtual machine server being configured to offload a workload required by the data replication based on the changed data related information within the specified range;

receiving, in response to offloading the workload, the changed data related information indicating a type of data change within the specified range from the virtual machine server, the type of data change including one or more of a data addition and a data modification;

obtaining the type of data change indicated in the changed data related information within the specified range;

optimizing the data replication by obtaining changed data from a source storage unit associated with the virtual machine based on the type of data change; and sending the obtained changed data and the changed data related information within the specified range to a destination storage array.

17. An apparatus for performing data replication of a virtual machine, comprising:
 a processor; and
 a memory coupled to the processor, the memory having instructions stored therein, the instructions when performed by the processor causing the apparatus to perform acts of:
  receiving, from a source storage array, changed data and changed data related information within a specified range, a workload required by the data replication being offloaded from a virtual machine server to the source storage array based on the changed data related information within the specified range, offloading of the workload including sending, by the virtual machine server, the changed data related information indicating a type of data change within the specified range to the source storage array, the type of data change including one or more of a data addition and a data modification, the data change being associated with a source storage unit of a virtual machine, the source storage array being configured, in response to the offloading of the workload to the source storage array, to optimize the data replication by obtaining changed data from the source storage unit based on the type of data change; and
  replicating, based on the type of data change, the changed data to a data portion of a destination storage unit corresponding to the specified range.

18. A computer program product having a non-transitory computer readable medium which stores a set of instructions to support data replication of a virtual machine; the set of instructions, when carried out by computerized circuitry, causing the computerized circuitry to perform a method of:
 performing, by a virtual machine server for a source storage unit associated with a virtual machine in a storage system, changed data tracking to obtain changed data related information related to the virtual machine, the storage system including a source storage array and a destination storage array, the changed data related information indicating a type of data change related to the virtual machine, the type of data change including one or more of a data addition and a data modification;
 obtaining, by the virtual machine server from the changed data related information, changed data related information related to the virtual machine indicating the type of data change within a specified range in response to receiving, from the source storage array, an obtainment request for the changed data related information within the specified range; and
 offloading a workload required by the data replication from the virtual machine server to the source storage array based on the changed data related information within the specified range, the offloading of the workload including sending, by the virtual machine server, the changed data related information indicating the type of data change within the specified range to the source storage array, the source storage array being configured, in response to the offloading of the workload to the source storage array, to optimize the data replication by obtaining changed data from the source storage unit based on the type of data change, and sending the obtained changed data and the changed data related information within the specified range to the destination storage array.

19. A computer program product having a non-transitory computer readable medium which stores a set of instructions to perform data replication of a virtual machine; the set of instructions, when carried out by computerized circuitry, causing the computerized circuitry to perform a method of:
 in response to receiving a data replication request for a virtual machine, sending, by a source storage array to a virtual machine server, an obtainment request for changed data related information related to the virtual machine within a specified range, the virtual machine server being configured to offload a workload required by the data replication to the source storage array based on the changed data related information within the specified range;
 receiving, at the source storage array in response to offloading the workload to the source storage array, the changed data related information indicating a type of data change within the specified range from the virtual machine server, the type of data change including one or more of a data addition and a data modification;
 obtaining, by the source storage array, the type of data change indicated in the changed data related information within the specified range;
 optimizing, by the source storage array, the data replication by obtaining changed data from a source storage unit associated with the virtual machine based on the type of data change; and
 sending, by the source storage array, the obtained changed data and the changed data related information within the specified range to a destination storage array.

20. A computer program product having a non-transitory computer readable medium which stores a set of instructions to perform data replication of a virtual machine; the set of instructions, when carried out by computerized circuitry, causing the computerized circuitry to perform a method of:
 receiving, at a destination storage array from a source storage array, changed data and changed data related information within a specified range, a workload required by the data replication being offloaded from a virtual machine server to the source storage array based on the changed data related information within the specified range, offloading of the workload including sending, by the virtual machine server, the changed data related information indicating a type of data change within the specified range to the source storage array, the data change being associated with a source storage unit of a virtual machine, the type of data change including one or more of a data addition and a data modification, the source storage array being configured, in response to the offloading of the workload to the source storage array, to optimize the data replication by obtaining changed data from the source storage unit based on the type of data change; and
 replicating, by the destination storage array based on the type of data change, the changed data to a data portion of a destination storage unit corresponding to the specified range.

* * * * *